United States Patent [19]
Huey

[11] Patent Number: 5,873,143
[45] Date of Patent: Feb. 23, 1999

[54] EXHAUST FILTRATION SYSTEM FOR VACUUM CLEANERS

[75] Inventor: Terry Huey, 44 Vienna St., San Francisco, Calif. 94112

[73] Assignee: Terry Huey, San Francisco, Calif.

[21] Appl. No.: 774,311

[22] Filed: Dec. 26, 1996

[51] Int. Cl.⁶ ................ B01D 47/02; A47L 9/18
[52] U.S. Cl. ................ 15/351; 15/353; 96/331; 96/349; 96/356
[58] Field of Search ............... 55/255, 259, 364, 55/DIG. 2, DIG. 3, 244, 246, 248–250, 253; 15/347, 351, 353; 96/329–333, 348, 349, 356

[56] References Cited

U.S. PATENT DOCUMENTS

| | | | |
|---|---|---|---|
| 978,739 | 12/1910 | Griswold et al. | 55/244 |
| 1,363,331 | 12/1920 | Livermore | 55/244 |
| 1,561,928 | 4/1925 | Jaquith | 55/364 |
| 1,764,127 | 6/1930 | Stolpe | 55/364 |
| 1,802,228 | 4/1931 | Witte | 55/364 |
| 1,828,584 | 10/1931 | Andersen | 55/364 |
| 1,835,770 | 12/1931 | Gasner et al. | 55/364 |
| 1,839,582 | 1/1932 | Nordhem | 55/248 |
| 2,102,353 | 12/1937 | Brock | 55/249 |
| 2,191,717 | 2/1940 | Jeffery | 15/353 X |
| 2,233,167 | 2/1941 | Holm-Hansen | 55/250 X |
| 2,539,867 | 1/1951 | Schnabel | 55/246 |
| 2,609,190 | 9/1952 | Jackson | 55/244 X |
| 2,631,688 | 3/1953 | Osborne et al. | 15/353 X |
| 2,886,125 | 5/1959 | Denker | 55/246 X |
| 2,954,095 | 9/1960 | Brock | 55/246 |
| 3,234,713 | 2/1966 | Harper et al. | 55/246 |
| 3,286,444 | 11/1966 | Boswinkle et al. | 55/246 X |
| 4,011,624 | 3/1977 | Proett . | |
| 4,209,875 | 7/1980 | Pugh et al. . | |
| 4,302,225 | 11/1981 | Eckart et al. . | |
| 4,330,899 | 5/1982 | Miller et al. . | |
| 4,547,206 | 10/1985 | Sovis et al. . | |
| 4,554,698 | 11/1985 | Rennecker et al. . | |
| 4,678,485 | 7/1987 | Finley et al. | 55/255 |
| 4,704,142 | 11/1987 | Dukic, Jr. | 55/250 |
| 4,783,958 | 11/1988 | Borja | 55/248 X |
| 4,784,676 | 11/1988 | Hale | 55/259 |
| 4,874,404 | 10/1989 | Boswell | 55/244 X |
| 5,005,252 | 4/1991 | Steiner et al. . | |
| 5,199,963 | 4/1993 | Scarp | 55/246 |
| 5,205,014 | 4/1993 | Yoo . | |
| 5,243,734 | 9/1993 | Maurer et al. . | |
| 5,268,010 | 12/1993 | Zengerer | 55/248 X |
| 5,351,361 | 10/1994 | Buchtel . | |
| 5,354,347 | 10/1994 | McCoy et al. | 55/248 X |
| 5,481,780 | 1/1996 | Daneshvar | 55/250 X |
| 5,500,977 | 3/1996 | McAllise et al. . | |

FOREIGN PATENT DOCUMENTS

| | | | |
|---|---|---|---|
| 0055560 | 9/1952 | France | 55/248 |
| 0491194 | 1/1931 | Germany | 55/248 |
| 0554853 | 7/1932 | Germany | 55/248 |
| 0024835 | 11/1908 | United Kingdom | 55/248 |

*Primary Examiner*—Robert Spitzer
*Attorney, Agent, or Firm*—Burns, Doane, Swecker & Mathis, L.L.P.

[57] ABSTRACT

An exhaust filtration system that captures dust particles in water is provided. The filtration system removes a substantial part of the dust that is normally discharged into the environment with the air. The system includes: (a) device for filtering contaminated air to substantially remove debris therefrom and to thereby generate an initially filtered air with dust entrained therein; (b) an exhaust filtration system comprising a chamber having an air inlet to admit the initially filtered air into the chamber wherein the chamber contains water; (c) device for causing the initially filtered air to come into contact with the water to trap at least a portion of the dust from the initially filtered air to produce substantially dust-free air; and (d) device for discharging the dust-free air into the atmosphere.

13 Claims, 3 Drawing Sheets

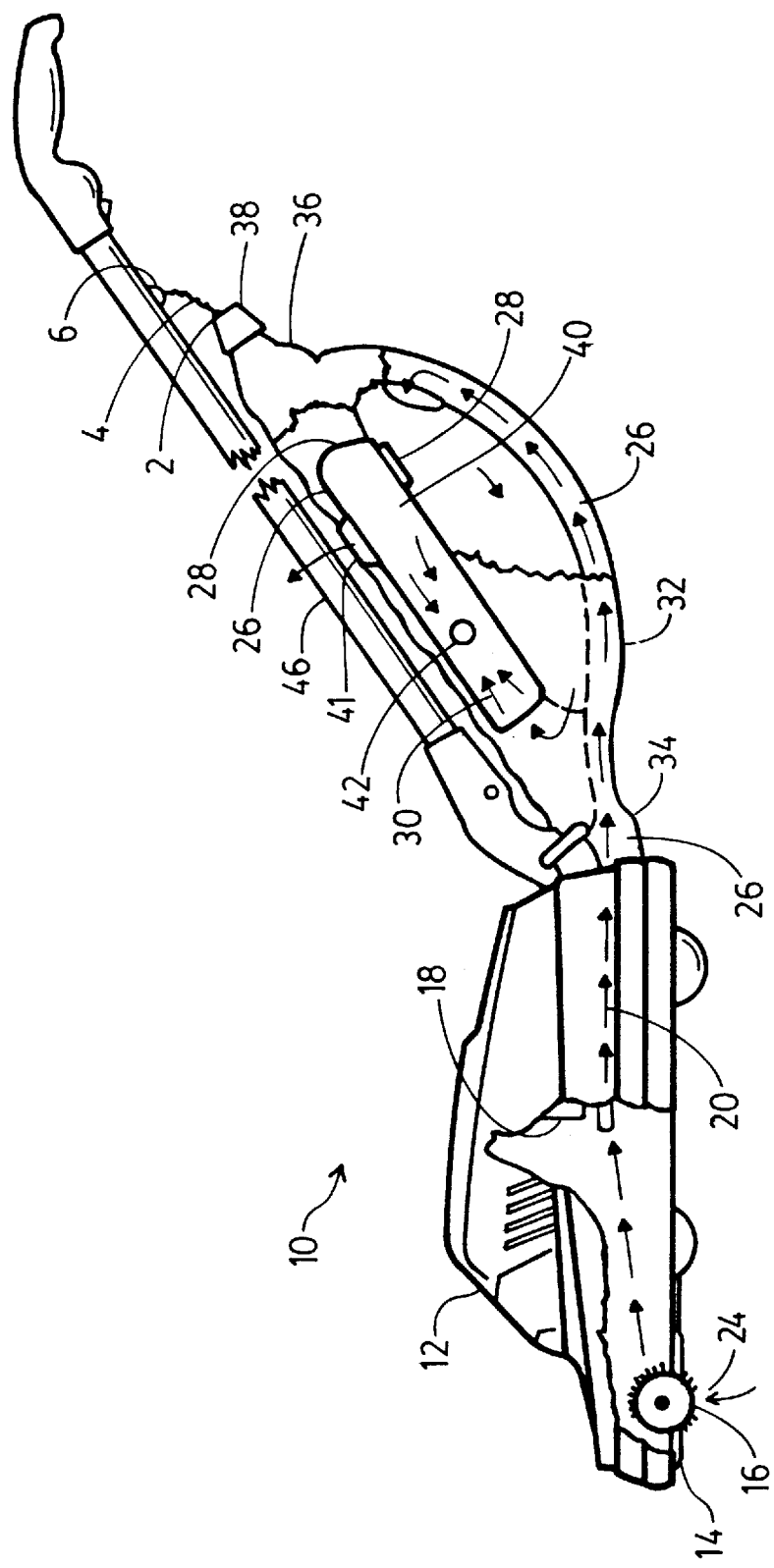
FIG._1.

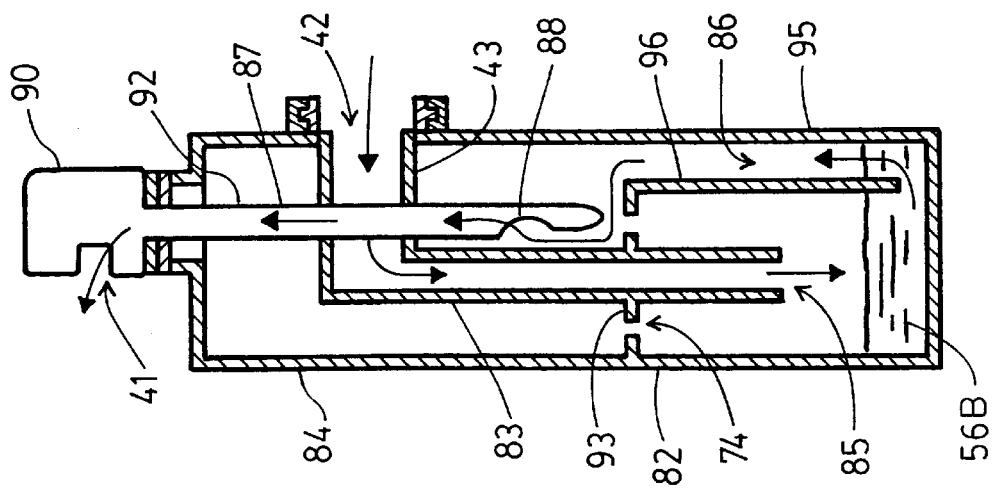
FIG._3.
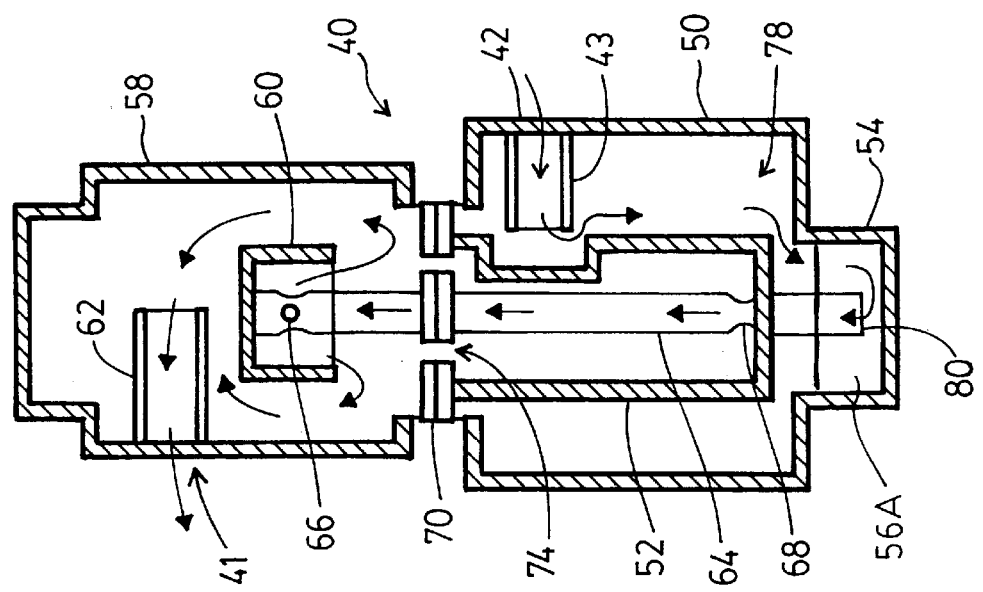
FIG._2.

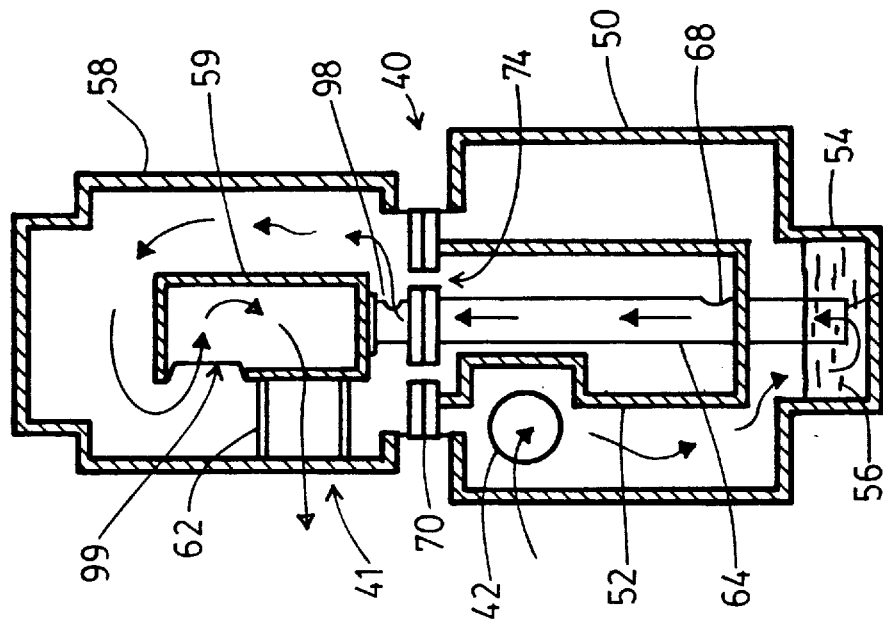
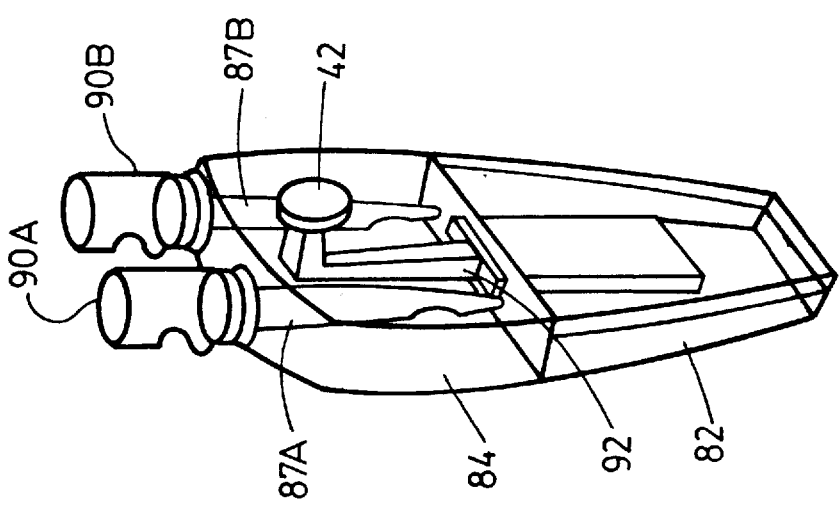
FIG._5.
FIG._4.

EXHAUST FILTRATION SYSTEM FOR VACUUM CLEANERS

FIELD OF THE INVENTION

The present invention relates generally to vacuum cleaners having an exhaust filtration system for removing dust from contaminated air prior to being discharged into the environment.

BACKGROUND OF THE INVENTION

Vacuum cleaners include a variety of types ranging from heavy duty shop-type vacuum cleaners used in, for instance, basements, work rooms, and garages, and canisters and uprights used for medium to heavy-duty cleaning floors and floor coverings, furniture, and draperies, to the so-called stick-type vacuum cleaners which are used for light-duty dirt pick-up such as kitchen floors, and some light carpet cleaning.

Typically in conventional vacuum cleaners the air in the cleaner casing is discharged by a motor fan, so that the pressure in the casing is lower than atmospheric pressure. A high speed air stream is formed by this air pressure differential, causing the corrupt air including dust to be inhaled through a dust in-let plate and flexible hose with an air suction hole, and passed to a filter unit with a solid filter of paper or cloth. As the fine pores of the air filter are clogged by dust, the intake air power of the machine declines rapidly. Most of the large particles of dust are intercepted by the filter but micro particles are passed through the filter with the air and returned to diffuse back into the room. Thus, the room air becomes more turbid and harmful to health.

SUMMARY OF THE INVENTION

The present invention is based on the discovery that exceptionally effective vacuum cleaners can be manufactured by including an exhaust filtration system that captures dust particles in water or other suitable fluid. The filtration system removes a substantial part of the dust that is normally discharged into the environment and that resettles on the carpet.

In one aspect, the invention is directed to a vacuum cleaner that includes:

(a) means for filtering contaminated air to substantially remove debris therefrom and to thereby generate an initially filtered air with dust entrained therein;

(b) an exhaust filtration system comprising a chamber having an air inlet to admit the initially filtered air into the chamber wherein the chamber contains a fluid;

(c) means for causing the initially filtered air to mix with the fluid and thereby trap at least a portion of the dust from the initially filtered air in the fluid and to produce substantially dust-free air; and (d) means for discharging the substantially dust-free air into the atmosphere.

In another aspect, the invention is directed to an upright vacuum cleaner that includes:

(a) a pivoting handle;

(b) a bag that extends along the pivotal handle, wherein the bag has an inlet;

(c) air flow generating means for producing a flow of air containing contaminated air into the bag through the inlet whereby debris is filtered by the bag and an initially filtered air with dust entrained therein is generated;

(d) an exhaust filtration system comprising a chamber having an air inlet to admit the initially filtered air into the chamber wherein the chamber contains a fluid; and (e) means for causing the initially filtered air to mix with the fluid and thereby trap at least a portion of the dust from the initially filtered air to produce substantially dust-free air.

In a preferred embodiment, the vacuum cleaner includes a device having a plurality of chambers and having an inlet for receiving the initially filtered air and an outlet, wherein the device further includes a reservoir for accommodating a sufficient amount of water to trap dust particles from the initially filtered air prior to being discharged from the device through the outlet.

BRIEF DESCRIPTION OF THE DRAWINGS

The invention will be described in greater detail with reference to the accompanying drawings in which like elements bear like reference numbers.

FIG. 1 is a side elevational view of a vacuum cleaner employing the inventive exhaust filtration system;

FIGS. 2, 3 and 5 are cross sectional views of exhaust filtration systems; and

FIG. 4 is a partial exposed side view of the exhaust filtration system of FIG. 3.

DESCRIPTION OF THE PREFERRED EMBODIMENTS

Referring to FIG. 1, there is illustrated an upright vacuum cleaner 10 of one type which embodies features of the present invention. As illustrated, the upright cleaner comprises a conventional main or floor engaging body 12, nozzle 14, rotary agitator 16, and a vacuum generating means or motor-fan unit 18. The motor-fan unit creates a flow of dirt laden air, indicated by arrows 20, through the main body to a dirt collecting filter bag 22. As illustrated, a vacuum pressure is generated at the nozzle to draw the dirt laden air through nozzle opening 24 and then the dirt laden air is pressurized by the motor-fan unit and transmitted from the main body, through an air duct 26 and into the dirt collecting filter bag attached to end portion 28 of the air duct.

The dirt collecting filter bag 22 is formed of air pervious material such as, for example, paper or cloth and functions to filter all the dirt laden air and collect the dirt and dust particles therein. Filtered air, indicated by a plurality of arrows such as, for example, arrows 30, emanates from the filter bag and enters the exhaust filtration system 40 through inlet port 42. As further described herein, a substantial portion of the dust in the air 30 is removed by system 40 before the substantially dust-free air is discharged into the environment through port 41. The outer bag or jacket 32 encompasses the inner filter bag and provides support therefor. The jacket can be formed of either air pervious material such as, for example, cloth or a perforated vinyl material or of impervious material. When the jacket is impervious to air, essentially all of the air and entrained dust will enter the filtration system whereas in the case where the jacket is pervious, some of the air and dust will be exhausted into the environment. In the former (impervious) embodiment, a higher pressure may be required to push the air through the filtration system. For safety reasons it may be desirable to use a jacket that is pervious to air especially if the vacuum cleaner is used in an environment where some dust from the exhaust can be tolerated. Nevertheless, even when the jacket is pervious to air, it has been demonstrated that a substantial portion of the dust emanating from filter bag 22 is collected by the exhaust filtration system.

The illustrated outer bag is of a tubular-like construction with its open lower end 34 being clamped about the air duct 26 for support and for providing air flow communication between the main body 12 and the interior of the outer bag. A top or upper end 36 of the outer bag is connected to a bag end or support cap 38 which, in the illustrated arrangement, was formed rigid of a rigid molded plastic material although other materials could be utilized. A resilient means, illustrated as spring 4, is connected to eyelet 2 of the bag cap and hook 6 on a pivoting operating handle 46 for support of the outer bag at its uppermost extension alongside the generally vertically extending pivoting handle.

As shown in FIG. 2, the exhaust filtration system 40 includes lower chamber 50 and upper chamber 58. The lower chamber includes entry tube 43 which includes an air inlet 42 to admit contaminated air that has passed through filter bag 22. The lower side of the lower chamber has reservoir 54 into which water or other suitable dust collecting fluid 56A is placed. The lower chamber also includes baffles 52 which channels the flow of contaminated air from inlet 42 into the water. Lower chamber 50 is connected to upper chamber 58 by an elongated tube 64 which has a lower inlet 80 and outlets 66 in the upper chamber. Upper chamber includes upper baffles 60, exit tube 62 which connects to air outlet 41. The elongated tube also preferably has openings 68 near the lower inlet. The lower and upper chambers are separated by partition 70 which preferably has holes 74. In the event that moisture is drawn into the upper chamber the moisture in the form of water drops will fall back into the reservoir through the holes. Although the exhaust filtration system is illustrated as being positioned inside jacket 32, it is understood that the system can be located at any location to collect exhaust air from the filter bag of a vacuum cleaner or similar debris collecting device in vacuum cleaning systems.

In operation, when the vacuum cleaner is in use, air that is contaminated with dust enters the lower chamber through inlet 42 and is channeled into and through the water in the reservoir. It should be noted that when the vacuum cleaner is in use a significant amount of turbulence is created by the flow of the air through the filtration system and by the motion of the vacuum cleaner as it is moved from place to place. The turbulence causes the water to move through out the regions of the low chamber 50. This has a cascade effect in that water comes into initial contact with a significant portion of the air and thereby trap the dust. In this process, the contaminated air is filtered to substantially remove the dust that is entrained in the air. Clean air that is substantially dust-free travels through tube 64 and exits through exit 41. The upper baffles assure that moisture is recovered. The depth of the reservoir and the amount of water employed should be sufficient so that the water covers tube inlet 80 even when the exhaust filtration system is tilted at an angle as shown in FIG. 1.

To increase the amount of water dispersed (or sprayed) into region 78, the lower edge of the baffles 52 can be designed to be further from reservoir 54. In addition, the upper baffles 60 can be designed to be closer to partition 70 in order to reduce the amount of moisture loss. As is apparent, additives such as, for example, disinfectants, bactericides and perfumes, can be added to the water in the reservoir. The exhaust filtration system is particularly useful for vacuuming hospitals and preparing clean rooms for use in fabricating semiconductors.

FIG. 3 is an embodiment of the exhaust filtration system which is particularly suited for being attached to the exterior of a conventional vacuum cleaner. For instance, inlet 42 can be connected to an exhaust outlet formed on an air-impervious jacket that enshrouds the dirt collecting filter bag. The system includes lower chamber 82 and upper chamber 84 which is separated by partition 93. Contaminated air is admitted through inlet 42, through entry tube 43, and down the elongated tube 83 which has outlet 85. The lower chamber contains water 56B. The upper and lower chambers are connected by side channel 86 which is defined by inner panel 96 and side wall 95. The upper chamber is connected via exit tube 87 to the vent 90 which has outlet 41.

In operation, air that is contaminated with dust enters the lower chamber through outlet 85. The contaminated air is filtered by the water. Substantially dust-free air then flows through channel 86, enters inlet 88 of exit tube 92, and is discharged through outlet 41. Partition 93 has holes 74 which permits moisture to fall back into the lower chamber.

As depicted in FIG. 4, an embodiment of the system of FIG. 3 includes dual exit tubes 87A and 87B which are connected to dual vents 90A and 90B, respectively.

FIG. 5 is an embodiment of an exhaust filtration system that has similar features to the system as shown in FIG. 4 except, among other things, that upper chamber 58 includes enclosure 59 which is supported by tube 64. The enclosure is connected to exit 41 via exit tube 62. In operation, air which enters the interior of the upper chamber through port 98 of tube 64 travels through exit 41. In this embodiment, the inlet 42 is located on the same side as the exit. When the exhaust filtration system is positioned in the vacuum cleaner, water will not inadvertently spill out of the interior of the lower chamber when the vacuum cleaner is in the tilted position as shown in FIG. 1.

Preferably, the exhaust filtration system is fabricated from parts that can be easily disassembled and cleaned. In particular, the reservoir compartment 54 should be removable so that dust laden water can be removed and replaced with fresh water. The interior of the filtration system which comes into contact with the air, dust, and/or water preferably has rounded surfaces so that there are no "dead zones" where dust can accumulate inside the chamber. The particular configuration and dimensions of the exhaust filtration system are not critical although they should be selected so that an excessive pressure drop through the system is to be avoided. Further, while that invention has been illustrated with an upright vacuum cleaner, it is understood that the invention is applicable to filter dust from the exhaust of any source and/or vacuum cleaning device.

It has been demonstrated that vacuum cleaners employing the inventive exhaust filtration system effectively remove a substantial portion of the dust from the air exiting the collecting filter bag so that the discharged air is substantially free of dust. A corollary is that carpets are cleaner because dust does not resettle onto the carpet as is the case with conventional vacuum cleaners.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. An upright vacuum cleaner comprising:
   (a) a pivoting handle;
   (b) a bag that extends along the pivotal handle, wherein the bag has an inlet;

(c) air flow generating means for producing a flow of air containing contaminated air into the bag through the inlet whereby debris is filtered by the bag and an initially filtered air with dust entrained therein is generated;

(d) an exhaust filtration system comprising a chamber having an air inlet to admit the initially filtered air into the chamber wherein the chamber contains an amount of fluid sufficient to fill the chamber to a first level wherein the air inlet has an aperture in the chamber that is above the first level and wherein the bag is enshrouded by an external cover which has an outlet that is in fluid communication with the air inlet of the exhaust filtration system; and (e) means for causing the initially filtered air to mix with the fluid and thereby trap at least a portion of the dust from the initially filtered air to produce substantially dust-free air.

2. The vacuum cleaner of claim 1 wherein said exhaust filtration system comprises a reservoir where the fluid is stored.

3. The vacuum cleaner of claim 2 wherein said exhaust filtration system comprises a lower compartment that is in fluid communication with an upper compartment, with the lower compartment containing the fluid.

4. The vacuum cleaner of claim 3 wherein the exhaust filtration system comprises baffles for channeling the initial filtered air into contact with the fluid.

5. The vacuum cleaner of claim 4 wherein the exhaust filtration system comprises an elongated tube having an inlet that is positioned in the fluid and an outlet that is in the second compartment.

6. The vacuum cleaner of claim 5 wherein the lower compartment is separated from the upper compartment by a barrier that defines one or more holes.

7. An upright vacuum cleaner comprising:

(a) a pivoting handle;

(b) a bag that extends along the pivotal handle, wherein the bag has an inlet;

(c) air flow generating means for producing a flow of air containing contaminated air into the bag through the inlet whereby debris is filtered by the bag and an initially filtered air with dust entrained therein is generated;

(d) an exhaust filtration system comprising a chamber having an air inlet to admit the initially filtered air into the chamber wherein the chamber contains an amount of fluid sufficient to fill the chamber to a first level wherein the air inlet has an aperture in the chamber that is above the first level and wherein the bag is enshrouded by an external cover wherein the outer surface of the bag and the inner surface of the cover defines a compartment where the exhaust filtration system is positioned, and wherein the external cover has an outlet that is in fluid communication with the air inlet of the exhaust filtration system; and (e) means for causing the initially filtered air to mix with the fluid and thereby trap at least a portion of the dust from the initially filtered air to produce substantially dust-free air.

8. The vacuum cleaner of claim 7 wherein said exhaust filtration system comprises a reservoir where the fluid is stored.

9. The vacuum cleaner of claim 8 wherein said exhaust filtration system comprises a lower compartment that is in fluid communication with an upper compartment, with the lower compartment containing the fluid.

10. The vacuum cleaner of claim 9 wherein the exhaust filtration system comprises baffles for channeling the initial filtered air into contact with the fluid.

11. The vacuum cleaner of claim 10 wherein the exhaust filtration system comprises an elongated tube having an inlet that is positioned in the fluid and an outlet that is in the second compartment.

12. The vacuum cleaner of claim 11 wherein the lower compartment is separated from the upper compartment by a barrier that defines one or more holes.

13. The vacuum cleaner of claim 7 wherein the external cover is made of material which is impervious to air.

\* \* \* \* \*